(12) United States Patent
Kwak

(10) Patent No.: US 8,184,239 B2
(45) Date of Patent: May 22, 2012

(54) LIQUID CRYSTAL DISPLAY DEVICE

(75) Inventor: Young-Jae Kwak, Gyeongsangnam-Do (KR)

(73) Assignee: LG Display Co., Ltd., Seoul (KR)

( * ) Notice: Subject to any disclaimer, the term of this patent is extended or adjusted under 35 U.S.C. 154(b) by 226 days.

(21) Appl. No.: 12/292,952

(22) Filed: Dec. 1, 2008

(65) Prior Publication Data

US 2009/0290088 A1 Nov. 26, 2009

(30) Foreign Application Priority Data

May 23, 2008 (KR) .................. 10-2008-0048252

(51) Int. Cl.
*G02F 1/1335* (2006.01)
(52) U.S. Cl. ................. 349/69; 349/58; 349/59; 349/60
(58) Field of Classification Search .............. 349/58–60, 349/69

See application file for complete search history.

(56) References Cited

U.S. PATENT DOCUMENTS

| 2005/0099806 A1* | 5/2005 | Tsai ............................... 362/218 |
| 2008/0024694 A1* | 1/2008 | Kondo et al. .................... 349/58 |
| 2009/0066877 A1* | 3/2009 | Abe et al. ........................ 349/62 |

* cited by examiner

*Primary Examiner* — Phu Vu
(74) *Attorney, Agent, or Firm* — Morgan, Lewis & Bockius LLP

(57) ABSTRACT

Disclosed is an LCD device capable of enhancing a display quality on a screen by minimizing feature changes of light emitting diodes (LED) due to heat in a structure that heat is rapidly emitted, from the LED serving as a light source, to outside of a lower cover. The LCD device comprises an LC panel; a plurality of light emitting diodes disposed below the LC panel, and supplying light to the LC panel; a lower cover having one or more heat emitting holes at a bottom surface adjacent to the light emitting diodes, and receiving the light emitting diodes in correspondence to one or more inner side surfaces thereof; and a heat emitting sheet disposed in the lower cover so as to correspond to the one or more heat emitting holes.

6 Claims, 4 Drawing Sheets

LIQUID CRYSTAL DISPLAY DEVICE

RELATED APPLICATION

This application claims the benefit of Korea Patent Application No. 10-2008-0048252, filed on May 23, 2008, which is herein expressly incorporated by reference in its entirety.

BACKGROUND OF THE INVENTION

1. Field of the Invention

The present invention relates to a liquid crystal display (LCD) device, and more particularly, to an LCD device capable of enhancing a display quality on a screen by minimizing feature changes of light emitting diodes (LED) due to heat in a structure that heat is rapidly emitted, from the LED serving as a light source, to outside of a lower cover.

2. Background of the Invention

In general, a liquid crystal display (LCD) device is being widely used due to advantages such as a light weight, a thin thickness, and low power consumption. Accordingly, the LCD device is being widely used to display images on screens of a portable computer, a portable phone, and office automation equipment.

The LCD device displays desired images on a screen by controlling optical transmittance according to image signals applied to a plurality of controlling switching devices arranged in a matrix format.

The LCD device comprises an LC panel and a driving portion. The LC panel includes an upper substrate, a color filter substrate facing a lower substrate, a thin film transistor (TFT) array substrate, and an LC layer sandwiched by the upper and lower substrates. The driving portion drives the LC panel by supplying scan signals and image information to the LC panel.

Since the LCD device does not spontaneously emit light, it is provided with a light source to supply light to the LC panel. Accordingly, the LCD device is provided with a backlight assembly including a light source to supply light to the LC panel, a light guide plate for converting light emitted from the light source into white light which is uniformly planarized, an optical sheet, etc.

The optical source of the backlight assembly includes cold cathode fluorescent lamps (CCFL), external electrode fluorescent lamps (EEFL), light emitting diodes (LED), etc.

As an optical source of the conventional backlight assembly, the cold cathode fluorescent lamps (CCFL) were mainly used. However, nowadays, an LCD device mostly adopts the light emitting diodes (LED) having advantages in power consumption, weight, brightness, etc. according to its trend such as a small size, a thin thickness, and a light weight.

Hereinafter, the conventional LCD device will be explained in more detail with reference to the attached drawings.

As shown in FIG. 1, the conventional LCD device comprises an LC panel 1, a plurality of light emitting diodes 2 for supplying light to the LC panel 1, a printed circuit board (PCB) 5 having the light emitting diodes 2 mounted thereon, a lower cover 3 having the PCB 5 fixed to an inner side surface thereof, a light guide plate 6 disposed in the lower cover 3, for guiding light emitted from the light emitting diode 2 to the LC panel 1, an optical sheet 7 for converting light emitted from the light guide plate 6 and supplying it to the LC panel 1, and a reflection sheet (not shown) for reflecting light that has leaked to a lower side of the light guide plate 6 thereby guiding into the light guide plate 6.

The plurality of light emitting diodes 2 mounted on the PCB may be provided with three light emitting diodes, red, green, and blue (RGB) as one unit, so that white light can be emitted as the respective RGB diodes are mixed to each other. The light emitting diodes 2 may be also configured so as to emit white light by being additionally provided with a fluorescent material at exit surfaces thereof.

As the light emitting diodes 2 are used for a long time, light emitted from the light emitting diodes 2 has feature changes. This may cause white light close to one of RGB rather than pure white light, to be supplied to the LC panel 1.

More concretely, the light emitting diodes 2 have disadvantages to generate a large quantity of heat when being driven, whereas they have advantages in power consumption, weight, and brightness, and the RGB light emitting diodes 2 have different feature changes occurring due to heat. Accordingly, as usage time of the light emitting diodes 2 lapses, white light close to one of RGB rather than pure white light, is supplied to the LC panel 1. This may cause the LC panel 1 to display one of RGB on its screen, which may degrade a display quality on the screen.

Accordingly, there have been required means to rapidly emit heat generated from the light emitting diodes 2 to outside of the lower cover 3.

SUMMARY OF THE INVENTION

Therefore, an object of the present invention is to provide an LCD device capable of enhancing a display quality on a screen by minimizing feature changes of light emitting diodes (LED) due to heat in a structure that heat is rapidly emitted, from the LED serving as a light source, to outside of a lower cover.

To achieve these and other advantages and in accordance with the purpose of the present invention, as embodied and broadly described herein, there is provided a liquid crystal display (LCD) device, comprising: an LC panel; a plurality of light emitting diodes disposed below the LC panel, and supplying light to the LC panel; a lower cover having one or more heat emitting holes at a bottom surface adjacent to the light emitting diodes, and receiving the light emitting diodes in correspondence to one or more inner side surfaces thereof; and a heat emitting sheet disposed in the lower cover so as to correspond to the one or more heat emitting holes.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Hereinafter, a liquid crystal display (LCD) device according to the present invention will be explained in more detail.

Figure 1:
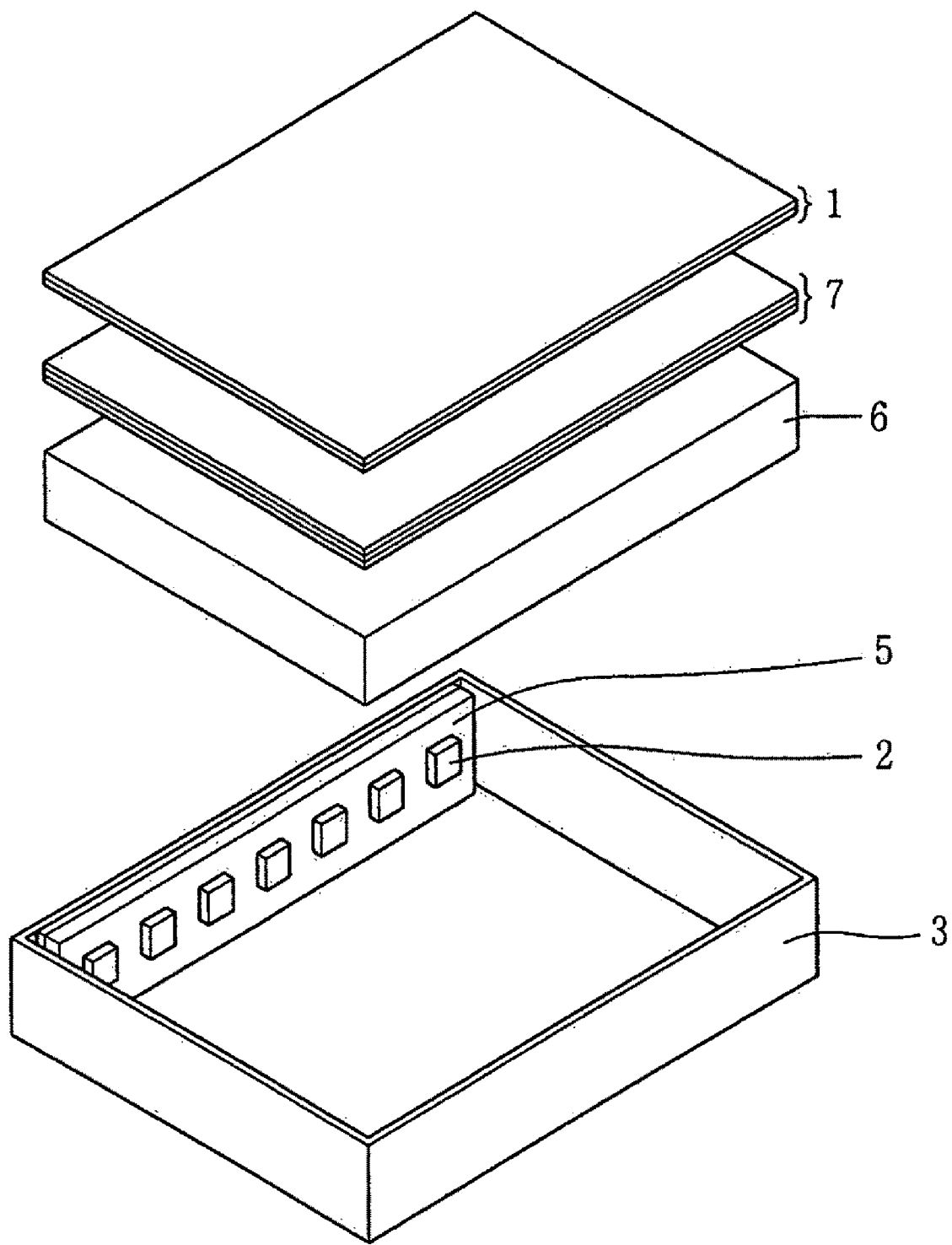
FIG. 1 is an exploded perspective view showing a liquid crystal display (LCD) device in accordance with the conventional art.
Figure 2:
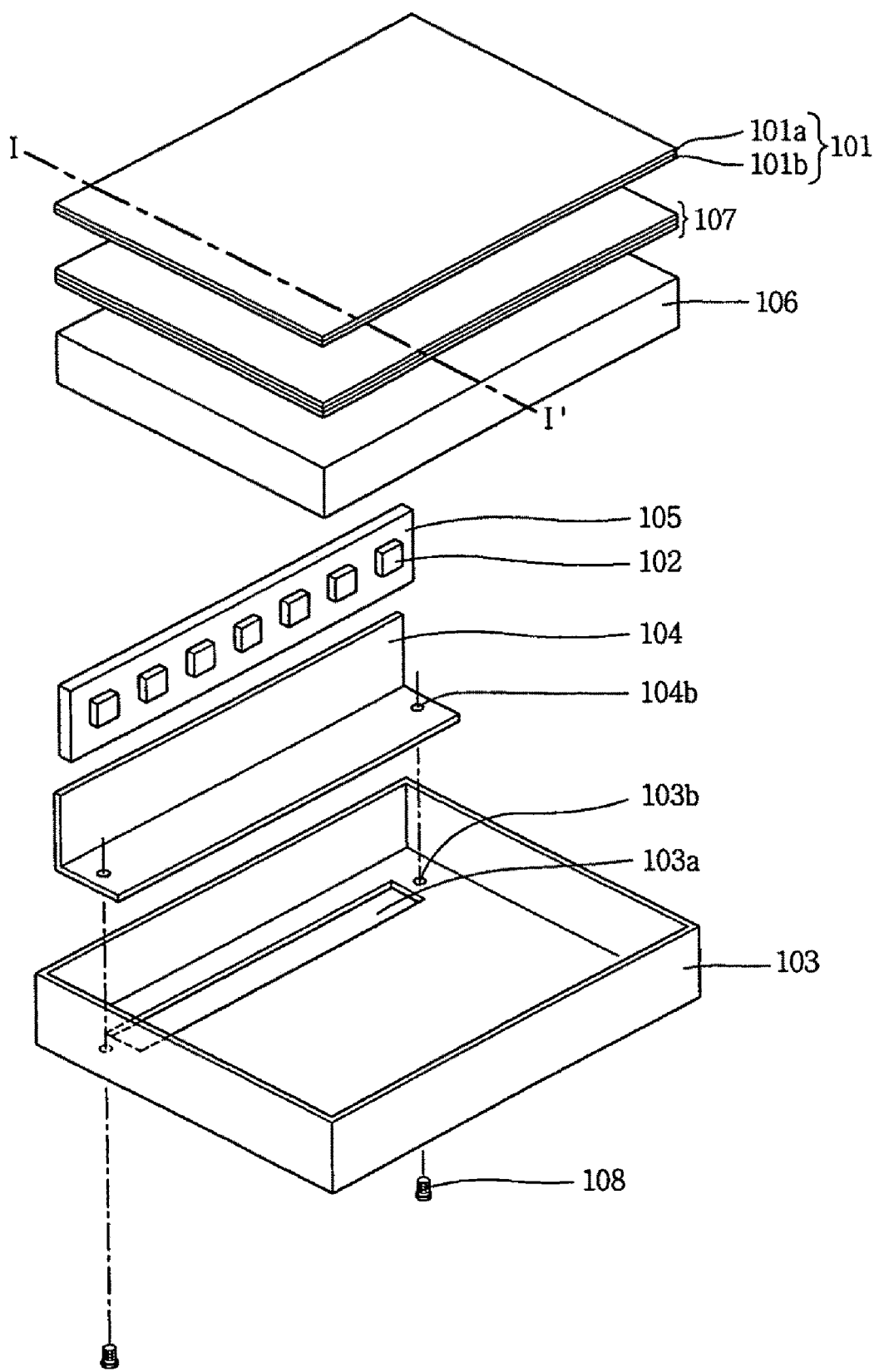
FIG. 2 is an exploded perspective view showing an LCD device according to the present invention.
Figure 3:
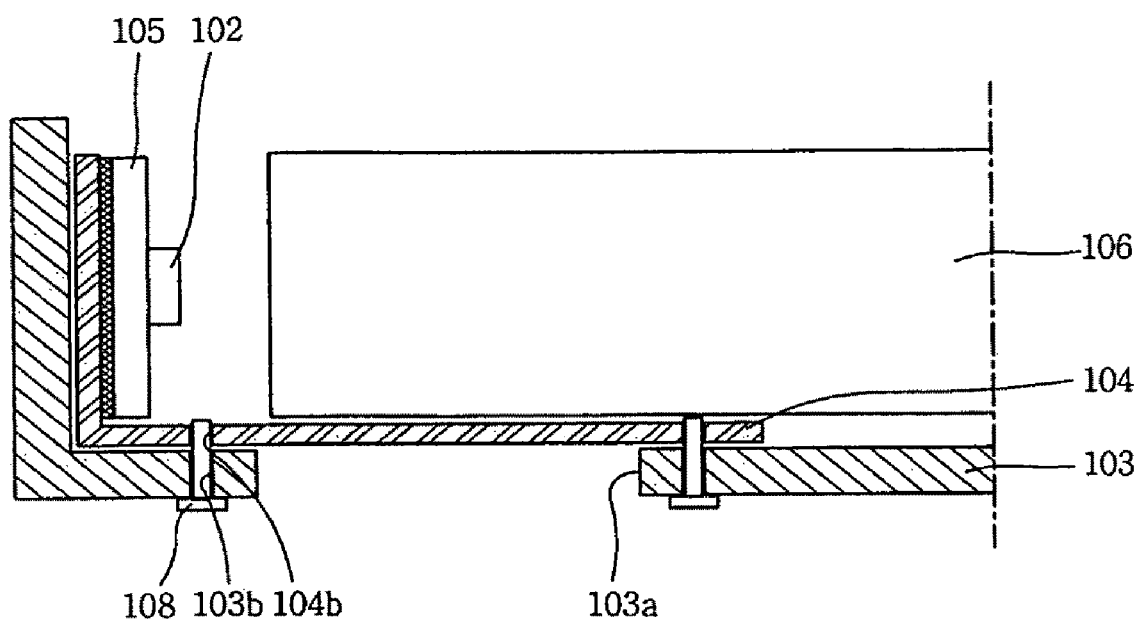
FIG. 3 is a sectional view taken along line 'I-I' in FIG. 2.

Referring to FIGS. 2 and 3, the liquid crystal display (LCD) device according to the present invention comprises: an LC panel 101; a plurality of light emitting diodes 102 disposed below the LC panel 101, and supplying light to the LC panel 101; a lower cover 103 having one or more heat emitting holes 103a at a bottom surface adjacent to the light emitting diodes 102, and receiving the light emitting diodes 102 in correspondence to one or more inner side surfaces thereof; and a heat emitting sheet 104 disposed in the lower cover 103 so as to correspond to the one or more heat emitting holes 103a.

Each component of the LCD device according to the present invention will be explained.

As shown in FIGS. 2 and 3, the plurality of light emitting diodes 102 for supplying light to the LC panel 101 are provided below the LC panel 101 in correspondence to one or more sides of the LC panel 101. The light emitting diodes 102 are mounted on a printed circuit board (PCB) 105.

The plurality of light emitting diodes 2 mounted on the PCB may be configured to be provided with red, green, and blue (RGB) light emitting diodes alternately arranged and generating white light by being mixed to each other. The light emitting diodes 2 may be also configured so as to emit white light by being additionally provided with a fluorescent material.

In the latter case, a yellow fluorescent material is formed on an exit surface of a blue light emitting diode, thereby obtaining white light. Also, red, green and blue fluorescent materials are formed on an outer surface of a light emitting diode that emits ultraviolet rays, so as to obtain white light by mixing RGB light to each other.

In FIGS. 2 and 3, the light emitting diodes 102 are provided below the LC panel 101 in correspondence to only one side of the LC panel 101. However, the light emitting diodes 102 may be provided below the LC panel 101 in correspondence to both sides of the LC panel 101.

As shown in FIGS. 2 and 3, the LCD device comprises a light guide plate 106 having an incident surface facing the LEDs 102, and an exit surface towards the LC panel 101. The light guide plate 106 mixes light emitted from the light guide plate 102 to each other, and changes a moving direction of the mixed light into the LC panel 101.

An optical sheet 107 for converting light emitted from the light guide plate 106 and supplying the converted light to the LC panel 101 is provided on the light guide plate 106. The optical sheet 107 includes a diffusion sheet, a prism sheet, and a protection sheet.

Although not shown, below the light guide plate 106, provided is a reflection sheet (not shown) for reflecting light that has leaked to a lower side of the light guide plate 106 thereby guiding the reflected light to move into the light guide plate 106. A reflection means (not shown) for reflecting light emitted from the LEDs 102 thereby guiding the reflected light to move into the light guide plate 106 may be provided on a front surface of the PCB 105 having the LEDs 102 mounted thereon.

Referring to FIGS. 2 and 3, the LCD device according to the present invention comprises the lower cover 103 that receives the PCB 105 having the LEDs 102 mounted thereon, in correspondence to an inner side surface thereof. Not only the PCB 105, but also a reflection sheet (not shown) or the light guide plate 106 are arranged in the lower cover 103.

The lower cover 103 is provided with one or more heat emitting holes 103a at a bottom surface adjacent to the LEDs 102.

When the PCB 105 having the LEDs 102 mounted thereon is disposed on not only one side surface of the lower cover 103, but also two side surfaces of the lower cover 103, two heat emitting holes 103a of are implemented at the lower cover 103.

In other words, the number of the heat emitting holes 103a of the lower cover 103 may be variable according to the position of the LEDs 102 disposed in the lower cover 103.

Preferably, the heat emitting hole 103a is designed to have a size that can enhance heat emitting efficiency without degrading stableness of the lower cover 103.

The heat emitting sheet 104 is disposed in the lower cover 103 in correspondence to one or more heat emitting holes 103a. Preferably, the heat emitting sheet 104 has a size equal to or larger than that of the heat emitting hole 103a.

The heat emitting sheet 104 is formed of a material having high conductivity, for example, an aluminum-based metal such as AL1050-H18.

Referring to FIGS. 2 and 3, the heat emitting sheet 104 is disposed so as to correspond to not only the heat emitting holes 103a of the lower cover 103, but also a rear surface of the PCB 105. Accordingly, heat generated from the LEDs 102 is transmitted to the heat emitting sheet 104 through air, or is transmitted to the heat emitting sheet 104 through the PCB 105. The heat transmitted to the heat emitting sheet 104 is exhausted to air outside the lower cover 103 through the heat emitting holes 103a.

Referring to FIGS. 2 and 3, one or more first fixing holes 104b are formed at the heat emitting sheet 104, and one or more second fixing holes 103b corresponding to the first fixing holes 104b are formed at the lower cover 103.

As the first fixing holes 104b of the heat emitting sheet 104 are coupled with the second fixing holes 103b of the lower cover 103 by screws 108, the heat emitting sheet 104 is fixed to inside of the lower cover 103.

In the present invention, the heat emitting sheet 104 is fixed to inside of the lower cover 103 by the first fixing holes 104b formed at the heat emitting sheet 104, the second fixing holes 103b formed at the lower cover 103, and the screws 108 coupled to the first fixing holes 104b and the second fixing holes 103b. However, the present invention is not limited to the above configurations. As long as a fixed state of the heat emitting sheet 104 at an inner side of the lower cover 103 can be maintained, various fixing means may be used.

Figure 4:
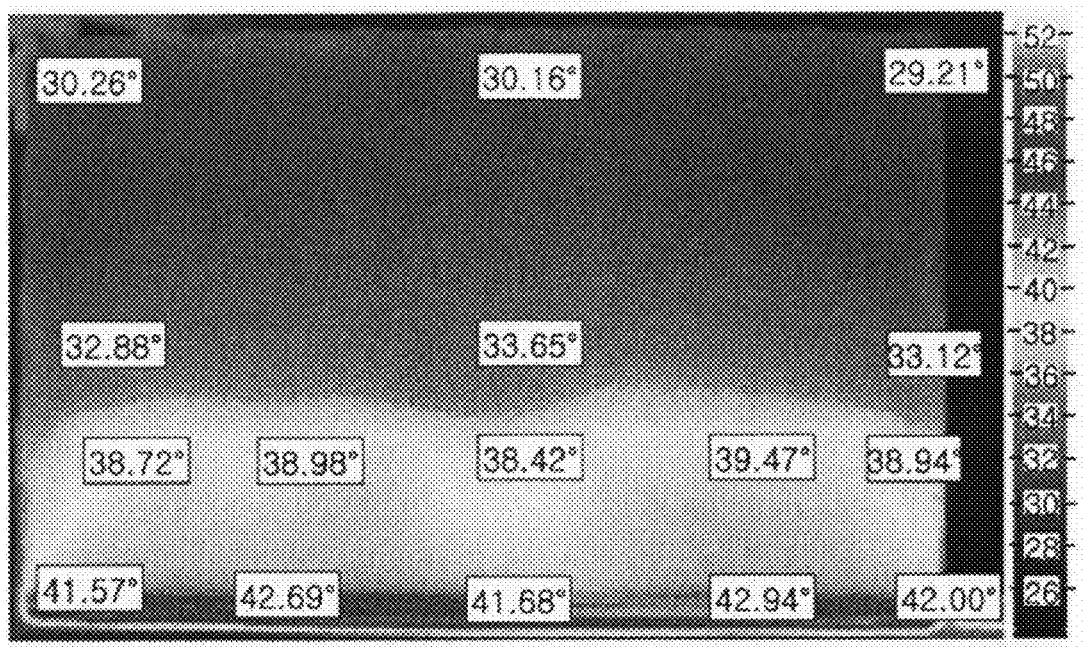
FIG. 4 is a view showing simulation results for temperature distribution on an LC panel measured by an infrared (IR) camera under a state that the LCD device of FIG. 2 is operated.
Figure 5:
FIG. 5 is a view showing simulation results for temperature distribution on a rear surface of a lower cover measured by an infrared (IR) camera under a state that the LCD device of FIG. 2 is operated.

FIG. 4 is a view showing simulation results for temperature distribution on an LC panel measured by an infrared (IR) camera under a state that the LCD device of FIG. 2 is operated, and FIG. 5 is a view showing simulation results for temperature distribution on a rear surface of a lower cover measured by an infrared (IR) camera under a state that the LCD device of FIG. 2 is operated.

Referring to FIG. 4, while the LCD device is operated, a screen of the LC panel 101 has a relatively high temperature at regions corresponding to not only the LEDs 102 but also the heat emitting sheet 104. More concretely, while the LCD device is operated, heat generated from the LEDs 102 is transmitted to the heat emitting sheet 104 having high conductivity without being concentrated onto regions close to the LEDs 102. Accordingly, the heat transmitted to the heat emitting sheet 104 is emitted to outside of the lower cover 103 through the heat emitting holes 103a thus to be removed. This causes the screen of the LC panel 101 to have a relatively high temperature at regions corresponding to not only the LEDs 102 but also the heat emitting sheet 104. Alternatively, if the heat emitting holes 103a are not formed at the lower cover 103 and the heat emitting sheet 104 is not provided, there is no path along which heat generated from the LEDs is emitted out. This may cause the screen of the LC panel to have a relatively much higher temperature at regions corresponding to the LEDs.

Referring to FIG. 5, while the LCD device is operated, a rear surface of the lower cover 103 has a relatively higher temperature at regions where the LEDs 102 and the heat emitting sheet 104 are arranged. That is, while the LCD device is operated, heat generated from the LEDs 102 does not stay in the lower cover 103, but is transmitted to the heat emitting sheet 104. Then, the heat is emitted to air outside the lower cover 103 through the heat emitting holes 103a of the lower cover 103. Accordingly, the rear surface of the lower cover 103 has a relatively higher temperature at regions where both of the LEDs 102 and the heat emitting sheet 104 are arranged. Alternatively, if the heat emitting holes 103a are not formed at the lower cover 103 and the heat emitting sheet 104 is not provided, there is no path along which heat generated from the LEDs is emitted out. This may cause the rear surface of the lower cover to have a relatively much higher temperature at regions corresponding to the LEDs.

In the present invention, while the LCD device is operated, heat generated from the LEDs 102 is transmitted to the heat emitting sheet 104, and then is rapidly emitted to air outside the lower cover 103 through the heat emitting holes 103a thereby to be removed. Accordingly, feature changes of the LEDs 102 due to heat are minimized.

As a result, even if usage time of the LCD device lapses, light having a color close to a pure white color designed at the time of fabricating the LCD device is supplied to the LC panel 101, which enhances a display quality of the screen of the LCD device.

Furthermore, in the LCD device according to the present invention, the heat emitting sheet 104 is formed so as to be extending to not only the heat emitting holes 103a of the lower cover 103, but also the rear surface of the PCB 105 having the LEDs 102 mounted thereon. Under this configuration, heat generated from the LEDs 102 and transmitted to the PCB 105 is directly transmitted to the heat emitting sheet 104, and then moves in the heat emitting sheet 104. Then, the heat is emitted to air outside the lower cover 103 through the heat emitting holes 103a. As a result, heat is more rapidly emitted out.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
    an LC panel;
    a light guide plate disposed below the LC panel, for guiding light to the LC panel;
    a plurality of light emitting diodes disposed at one side of the light guide plate in a predetermined interval from the light guide plate, and mounted on a printed circuit board (PCB for supplying light to the LC panel;
    a lower cover having one or more heat emitting holes at a bottom surface adjacent to the light emitting diodes, and receiving the light emitting diodes in correspondence to one or more inner side surfaces thereof; and
    a heat emitting sheet disposed in the lower cover so as to correspond to the one or more heat emitting holes, and formed so as to be extending up to a rear surface of the PCB, and an inner side surface of the lower cover,
    wherein an area of the heat emitting sheet corresponding to the heat emitting hole is exposed to the outside.

2. The LCD device of claim 1, wherein the heat generated from the light emitting diodes is emitted to outside of the lower cover through the heat emitting sheet and heat emitting holes.

3. The LCD device of claim 1, wherein the PCB is disposed so as to correspond to an inner side surface of the lower cover.

4. The LCD device of claim 1, wherein the printed circuit board is disposed at both sides of the light guide plate.

5. The LCD device of claim 1, wherein one or more first fixing holes are formed at the heat emitting sheet, one or more second fixing holes corresponding to the first fixing holes are formed at the lower cover, and
    wherein the heat emitting sheet is fixed to inside of the lower cover as the first fixing holes and the second fixing holes are coupled to one another by screws.

6. The LCD device of claim 1, wherein the heat emitting sheet is formed of a material such as AL1050-H18.

* * * * *